July 1, 1952     D. J. SIKORRA     2,602,154
CONTROL SYSTEM UTILIZING A MINIMUM EXCITATION CONTROL DEVICE
Filed Dec. 30, 1949

Inventor
Daniel J. Sikorra
by Didier Journeaux
Attorney

Patented July 1, 1952

2,602,154

UNITED STATES PATENT OFFICE 2,602,154

CONTROL SYSTEM UTILIZING A MINIMUM EXCITATION CONTROL DEVICE

Daniel J. Sikorra, Milwaukee, Wis., assignor to Allis-Chalmers Manufacturing Company, Milwaukee, Wis., a corporation of Delaware Application December 30, 1949, Serial No. 136,026

10 Claims. (Cl. 322—24)

This invention relates in general to regulating systems, and in particular to regulating systems utilizing a minimum excitation control device.

A minimum excitation control device operates to supply a voltage to the excitation controlling means of a dynamoelectric machine in a direction tending to increase the excitation of the machine when the excitation of the regulated machine tends to decrease below a predetermined minimum value. When the device is used in connection with a voltage regulator which supplies to the excitation controlling means a control voltage having a polarity and magnitude dependent upon the direction and magnitude of variations in the output voltage of the machine from a predetermined value, it is desirable to limit the amplitude of the control voltage when the control voltage has the polarity which causes the excitation of the machine to decrease, in order to limit the voltage which the voltage supplied by the minimum excitation control device must overcome.

Prior regulating systems sometimes utilized the relation between the watts output of the machine and the excitation of the machine to provide minimum excitation control since this relation is a measure of the stability of a dynamoelectric machine. Such systems balanced a voltage which was a measure of the watts output of the regulated machine against a voltage which was a measure of the excitation of the machine, and utilized the differential voltage, only when the former voltage exceeded the latter, to increase the excitation of the machine.

Such systems have the disadvantage that the relation between watt output and minimum excitation required for stability varies according to the voltage of the line being supplied by the generator. That is, for a given watt output of the machine, the minimum excitation required for stability of the machine increases when the line voltage decreases, and conversely. This necessitates that the two balanced voltages mentioned above be adjusted each time the system voltage is changed by the action of tap changers or other causes, in order to maintain accurate minimum excitation control of the machine at all times.

These disadvantages can be overcome by providing a minimum excitation control device which is independent of the output voltage of the machine and hence not affected by variations in this voltage. The relation between the in-phase component of current supplied by the machine and the excitation of the machine, for stable operation of the machine, is a linear one, and by utilizing a voltage which is a measure of this in-phase component of current in place of the voltage proportional to the watts output of the machine, a minimum excitation control device which is independent of the output voltage of the machine may be obtained.

It is therefore an object of this invention to provide a dynamoelectric machine regulating system utilizing a minimum excitation control device associated with a regulator which limits the maximum amplitude of a control voltage tending to decrease the excitation of the machine.

It is a further object of this invention to provide a dynamoelectric machine regulating system utilizing a minimum excitation control device which is responsive to the in-phase component of the current supplied by the machine.

It is an additional object of this invention to provide a dynamoelectric machine regulating system utilizing a minimum excitation control device which is independent of the output voltage of the machine.

Objects and advantages other than those stated above will be apparent from the following description when read in connection with the accompanying drawing, in which.

Figure 1:
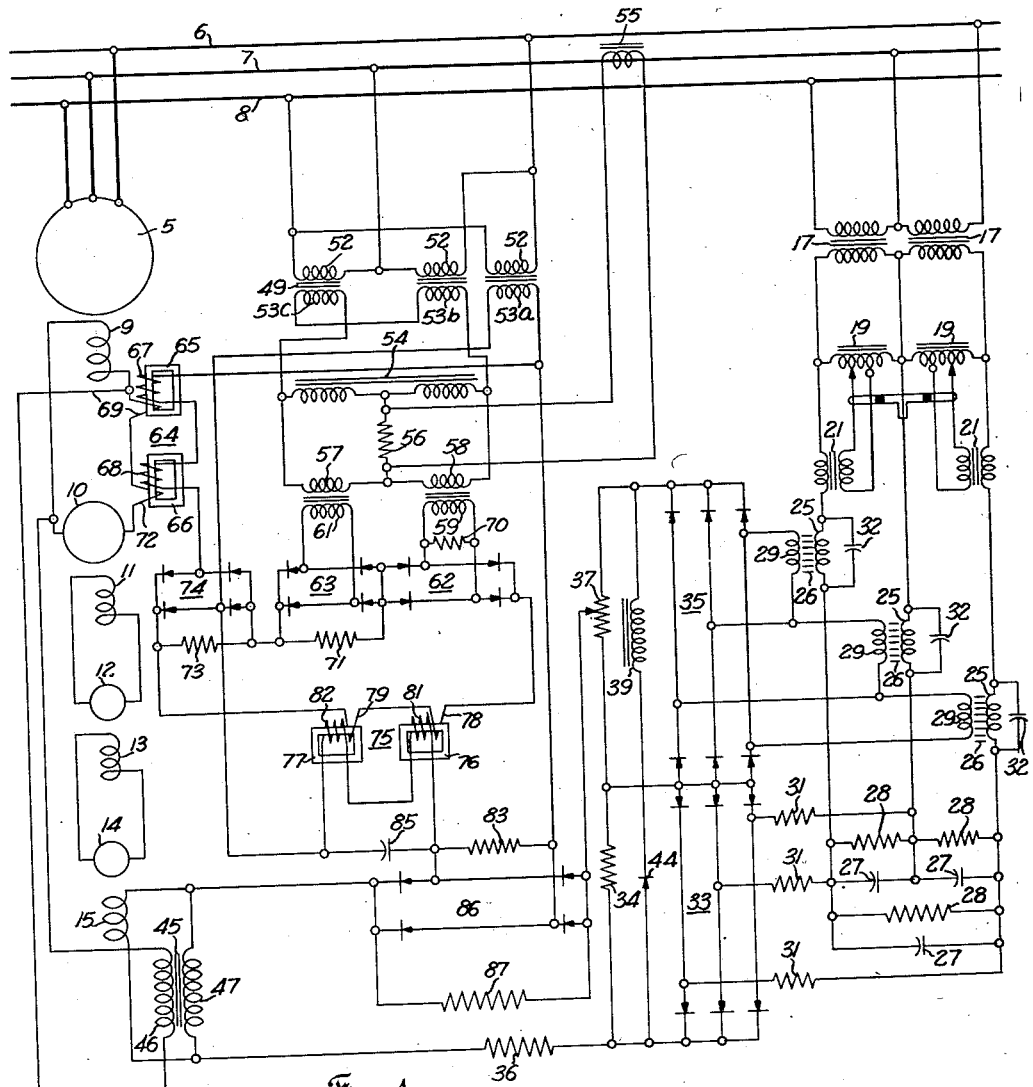
Fig. 1 is a diagrammatic representation of a regulating system embodying the apparatus and circuit of this invention.

Referring to Fig. 1, the invention is shown as applied to the regulation of a dynamoelectric machine 5 which supplies an alternating current load circuit represented by conductors 6, 7 and 8. Machine 5 is provided with a field winding 9, the energization of which is supplied by a main exciter generator 10. Main exciter 10 is provided with a field winding 11 which is energized by an exciter generator 12. The energization of a field winding 13 of exciter 12 is supplied by an exciter generator 14. Field winding 15 of exciter 14 is connected to be responsive to the voltage of machine 5 and to the excitation of field winding 9, to generally maintain the voltage of machine 5 at a substantially constant value only as long as the excitation of field winding 9 remains above a predetermined minimum value.

Connected to be responsive to variations in the voltage of machine 5 from a predetermined value is a regulator which supplies to field winding 15 a control voltage having a polarity and magnitude dependent upon the direction and magnitude of variations in the voltage of machine 5 from a predetermined value. The regulator may be of any suitable type, but is preferably of the kind disclosed and claimed in my copending application, Serial No. 114,751, filed September 9, 1949, now Patent No. 2,576,646. This regulator comprises a plurality of nonlinear resonant circuits, each circuit comprising the primary winding 25 of a saturable transformer 26 connected in series with a capacitor 27. Each winding 25 may be shunted by small capacitor 32 for the purpose of sharpening the point of resonance of the nonlinear circuits. One such nonlinear circuit is provided in each phase of the system and the circuits are energized by a measure of the voltage of machine 5 through transformers 17 connected to conductors 6, 7 and 8, autotransformers 19 and booster transformers 21.

Each saturable transformer 26 is provided with a secondary winding 29 for furnishing a voltage which is proportional to the voltage of its associated primary winding 25. Capacitors 27 are connected to a resistor 34 through voltage reducing resistors 31 and a three phase rectifier 33 to impress on resistor 34 a rectified voltage proportional to the average of the voltages of the capacitors 27. A three phase rectifier 35 is connected to secondary windings 29 of transformers 26 to produce across a resistor 37 a rectified voltage which is proportional to the average of the voltages of windings 29. Because of the connections of rectifiers 33 and 35, the voltage of resistor 34 opposes the voltage of resistor 37. Field winding 15 of exciter 14 is connected across resistor 34 and an adjustable portion of resistor 37 through an adjustable tap on resistor 37, and is thereby directionally energized by a control voltage equal to the difference between the voltages of resistor 34 and of a portion of resistor 37.

A resistor 36 in the circuit of field winding 15 serves to lower the time constant of this circuit and thereby accelerate the response of exciter 14 to variations in the differential voltage. Any suitable damping means, such as a transformer 45 having a primary winding 46 connected across exciter 10 and a secondary winding 47 connected in the circuit of field winding 15 may be utilized to prevent hunting of the system.

To provide means for limiting the amplitude of a control voltage of a polarity to decrease the excitation of field winding 15, a rectifier 44 and a filtering reactor 39 are connected in series across the outer terminals of rectifiers 33 and 35. Rectifier 44 is so poled as to block the flow of current when the voltage of resistor 37 exceeds the voltage of resistor 34. When the voltage of resistor 34 exceeds the voltage of resistor 37, rectifier 44 substantially short circuits resistors 34 and 37, thereby substantially equalizing the voltages of the resistors. This has the effect of limiting the maximum amplitude of the control voltage applied to field winding 15 in a direction tending to reduce the excitation of machine 5.

It will be apparent that if field winding 15 were connected across the noncommon terminals of resistors 34 and 37, rectifier 44 would institute its limiting action when zero voltage exists on field winding 15. However, as a result of the connection of field winding 15, as shown, to a terminal of resistor 34 and to the adjustable tap on resistor 37, when the limiting action of rectifier 44 takes place, the voltage impressed on field winding 15 has reversed and reached a predetermined value to permit limited reverse forcing of field winding 15.

Figure 2:
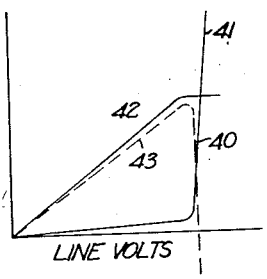
Fig. 2 is a graph, the curves of which represent the relationship between the voltages of the voltage responsive regulator of the invention.

The variations in the voltages across capacitors 27 and secondary windings 29 in function of variations of the output voltage of machine 5 are shown by the curves of Fig. 2. Curve 41 of Fig. 2 represents the portion of the rectified voltages of capacitors 27 which is impressed on resistor 34. Curve 42 represents the rectified voltage of transformer secondary windings 29 as it appears across the portion of resistor 37 adjacent resistor 34. Because of the nonlinearity of the circuit comprising a winding 25 and a capacitor 27, at low values of line voltage the major part of the voltage proportional to the voltage of machine 5, which is impressed on windings 25 and capacitor 27, is absorbed by windings 25. Hence, as the voltage of machine 5 is increased from zero, the voltage of windings 25 increases steadily as shown by curve 42 in Fig. 2, while the voltage of capacitors 27 remains at a low value as shown by the lower portion of curve 41, and differs sufficiently little from the value zero as to be without an appreciable effect on the operation of the system.

However, at a predetermined value of the voltage of machine 5 the nonlinear circuits become resonant. At this predetermined value the voltage of capacitors 27 suddenly increases as shown by the steep portion of curve 41, while the voltage of windings 25 remains substantially constant because of the saturation of transformers 26. A resistor 28 may be connected across each capacitor 27 to adjust the slope of this portion of curve 41. Since the voltage of each secondary winding 29 is directly proportional to the voltage of its associated primary winding 25, curve 42 may be considered as proportionally representing the voltage of secondary windings 29 as well as primary windings 25.

Curve 43, obtained by subtracting the ordinates of curve 41 from those of curve 42, represents the differential voltage applied to field winding 15 by the regulator at varying values of the voltage of machine 5.

In accordance with this invention, means are provided for maintaining the excitation of field winding 9 above a variable predetermined minimum value. Such means include a three phase transformer 49 having its primary phase windings 52 connected to load conductors 6, 7 and 8 to be thereby energized by a voltage which is a measure of the output voltage of machine 5. Transformer 49 is provided with secondary phase windings 53a, 53b and 53c, of which windings 53b, 53c only are connected in star. The ratio between the turns of the primary and secondary windings of transformer 49 may be of any suitable value, in accordance with the value of the voltage of conductors 6, 7 and 8.

An autotransformer 54 has its terminals connected to the noncommon terminals of the secondary phase windings 53b, 53c to produce across autotransformer 54 a voltage which is the resultant of the voltages of the two interconnected secondary phase windings 53b and 53c and which is in phase with the phase voltage of conductor 7. A current transformer 55, placed in series with the load conductor 7, produces across any suitable impedance means such as a resistor 56, a voltage which is a measure of the current in load conductor 7. Owing to the connection of the secondary phase windings 53b, 53c, the voltage of resistor 56 is in phase with the voltage of autotransformer 54 when the output of machine 5 is at unity power factor.

Resistor 56 has one of its terminals connected to a center tap on autotransformer 54 and the other of its terminals connected to the common terminal of the primary windings 57, 58 of two transformers, provided with secondary windings 59 and 61. Windings 57 to 61 all have the same number of turns. The terminals of autotransformer 54 are connected to the noncommon terminals of primary windings 57, 58. The voltage of secondary winding 59 will therefore be equal to the vectorial sum of the voltage of resistor 56 and one-half of the voltage of autotransformer 54, and the voltage of secondary winding 61 will be equal to the vectorial difference between one-half of the voltage of autotransformer 54 and the voltage of resistor 56. Secondary winding 59 is connected to the alternating current terminals of any suitable known full wave rectifier 62, and winding 61 is connected to the alternating current terminals of a similar full wave rectifier 63. A resistor 71 is connected to the direct current terminals of rectifier 63 and a resistor 70 is connected to the alternating current terminals of rectifier 62.

Figure 3:
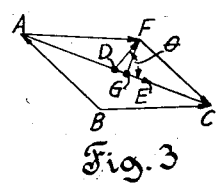
Fig. 3 is a diagram vectorially showing the relationship between the electric quantities employed in the minimum excitation control device of the invention.

Fig. 3 shows the relation between the voltage vectors of the circuits of the minimum excitation control device described thus far. Vector AB represents the voltage of secondary phase winding 53b and vector BC represents the voltage of secondary phase winding 53c. Vector AC is the resultant of vectors AB and BC and represents the voltage of autotransformer 54, since autotransformer 54 is connected across the noncommon terminals of windings 53b and 53c. Point D on voltage vector AC represents the center tap of autotransformer 54 to which one terminal of resistor 56 is connected.

The voltage of resistor 56, which is a measure of the current in conductor 7 of the load circuit, is represented by vector DE in phase with the voltage vector AC when the output of machine 5 is at unity power factor. The voltage of resistor 56 is represented by another vector DF when the current in the load circuit leads the output voltage of machine 5 by an angle θ. Owing to the connection of autotransformer 54, resistor 56 and windings 57, 58, at unity power factor in the output circuit of machine 5, the voltage of transformer secondary winding 59 is represented by the vector AE and the voltage of secondary winding 61 is represented by the vector EC. Since rectifiers 62 and 63 are connected to secondary windings 59 and 61, respectively, it will be apparent that the difference between the voltages of rectifiers 62 and 63 at unity power factor will be a voltage equal to twice the voltage of resistor 56.

At a power factor angle of θ in the output circuit of machine 5, the voltage of rectifier 62 may be represented by vector AF and the voltage of rectifier 63 by vector FC. The component of voltage DF which is in phase with the voltage AC may be obtained by projecting vector DF at DG on vector AC. By making voltage AC large compared with voltage DF, the difference between voltages AF and FC will be substantially equal to the difference between voltages AG and GC, which difference is directly proportional to the component of current in the load circuit in phase with the voltage of the load circuit.

The voltage of rectifier 62 will therefore exceed the voltage of rectifier 63 by an amount proportional to the in-phase component of the current supplied by machine 5 to the load circuit, and this voltage difference may be utilized as a measure of a characteristic of the current in the load circuit. Transformer 49, autotransformer 54 and resistor 56 therefore constitute measuring means for producing a voltage which is a measure of a characteristic of the load current and rectifiers 62 and 63 constitute rectifier means energized by a voltage proportional to the in-phase component of the current supplied by machine 5 to the load conductors. It will be seen that the voltage proportional to the in-phase component of current is independent of variations in the output voltage of machine 5, since this latter voltage effectively cancels itself owing to the connections of rectifiers 62 and 63. It will be apparent that other suitable impedance means, such as a reactor, should be used in lieu of resistor 56 to preserve the desired voltage relations in the circuits if the connections of one of windings 53b and 53c are reversed.

Suitable means are provided to produce a voltage which is a measure of the excitation of field winding 9 of machine 5. Such means may consist of a voltage divider, or a saturable reactor 64 having a pair of magnetic cores 65 and 66 severally associated with reactance windings 67 and 68 and two control windings 69 and 72. The voltage divider or the control windings 69 and 72 may be connected in series with exciter 10 and field winding 9 to be thereby traversed by the current in field winding 9. While the voltage divider or windings 69, 72 may also be connected in parallel with field winding 9, the series connection is preferable as the measure of excitation obtained thereby is independent of variations in the resistance of field winding 9 resulting from temperature variations. The control windings may comprise a variable number of turns depending upon the maximum current intensity in the field winding 9, and where the currents in field winding 9 are large, the control windings may consist of a straight section of bus bar penetrating through the window of the associated reactor core. Reactance windings 67 and 68 are energized from any suitable alternating current source such as winding 53a of transformer 49 and are connected to any suitable full wave rectifier 74.

Variations in the current through control windings 69 and 72 operate in a well known manner to produce variations in the reactance of windings 67 and 68 and thereby vary the voltage supplied to rectifier 74. Reactor 64 therefore constitutes variable impedance means connected to the field winding means of machine 5 for producing a voltage which is a measure of the excitation of machine 5. A resistor 73 is connected across the direct current terminals of rectifier 74 to be energized by a voltage which is a measure of the excitation of field winding 9 and machine 5.

One terminal of resistor 73 is connected to a direct current terminal of rectifier 63 and the other terminal of resistor 73 is connected to a direct current terminal of rectifier 62. Owing to the connection of rectifiers 62, 63 and 74, the voltages of rectifiers 63 and 74 are of cumulative polarity and oppose the voltage of rectifier 62.

A saturable reactor 75 comprising two cores 76 and 77, two control windings 78 and 79, and two reactance windings 81 and 82, is provided for amplifying the difference between the voltage of rectifier 62 and the voltage of rectifiers 63 and 74. Reactance windings 81 and 82 of reactor 75 are energized for any suitable alternating current source, preferably the same source which energizes windings 67 and 68 of reactor 65, namely, secondary winding 53a of transformer 49, through a resistor 83. A capacitor 85 connected across windings 81 and 82 serves to supply part of the exciting current of windings 81 and 82 to give the reactor 75 the desired characteristic. A suitable full wave rectifier 86 is connected across resistor 83, and a resistor 87 is connected to the direct current terminals of rectifier 86 and in the circuit of field winding 15 to be thereby energized by a rectified voltage proportional to the voltage drop in resistor 83.

Control windings 78 and 79 of reactor 75 are connected to the positive terminals of rectifiers 62 and 74 and are thereby energized by the difference between the voltage of rectifiers 63 and 74 and the voltage of rectifier 62. Variations in the current traversing control windings 78 and 79 operate in a well known manner to vary the reactance of windings 81 and 82 of reactor 75 and thereby vary the voltages of resistors 83 and 87 to supply a varying voltage to field winding 15. Current may flow in one direction through winding 78, winding 79, resistor 73, resistor 71 and rectifier 62, such direction being determined by the polarity of rectifier 62. However, rectifier 62 prevents the flow of current in such circuit in the opposite direction. Reactor 75 therefore constitutes variable impedance means differentially responsive to two voltages only when the first voltage is greater than the second voltage for energizing a controlling means.

Figure 4:
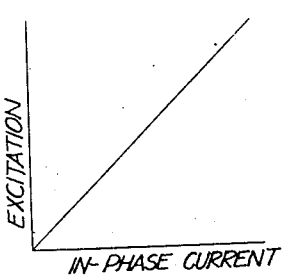
Fig. 4 is a graph showing the relationship between the minimum excitation of the regulated machine and a characteristic of the current supplied by the machine for stable operation.

The relation between the in-phase component of load current as a function of the minimum excitation of machine 5 for stable operation of machine 5 is shown by the graph of Fig. 4. The graph shows that the minimum excitation required for stable operation of machine 5 varies directly with the value of the in-phase component of current supplied by machine 5.

In operation, with machine 5 connected to load conductors 6, 7 and 8 as shown and with the excitation of field winding 9 above the predetermined minimum value, the circuit elements are so adjusted that when the voltage of machine 5 has the desired value, the cores of transformers 26 become saturated during parts of the voltage cycle and the voltage of field winding 15 is represented by a given point 40 on curve 43 of Fig. 2.

If, for any reason the voltage of machine 5 decreases below the normal value, the period of saturation of the cores of transformers 26 becomes shorter and the voltages of capacitors 27 decrease much more than the voltages of windings 25 and 29. Such action increases the difference between the voltages of resistors 34 and 37 and thereby increases the differential voltage applied to field winding 15 in a direction to increase the output voltage of exciter 14. Exciter 14 thereby causes an increase in the excitation of field winding 9 of machine 5 to prevent the voltage of machine 5 from dropping materially below the normal value.

When the voltage of machine 5 increases above the normal value the periods of saturation of the cores of transformers 26 become longer and the voltages of capacitors 27 increase much more than the voltages of windings 25 and windings 29, thereby decreasing or even reversing the voltage applied to field windings 15 to prevent the output voltage of machine 5 from materially exceeding the desired value.

If the excitation of field winding 9 is at least equal to the minimum excitation required to maintain machine 5 stable, as determined by the in-phase component of current in conductors 6, 7 and 8, the sum of the voltages of rectifiers 63 and 74 will exceed the voltage of rectifier 62. However, the resultant of such voltages will not cause current to flow through control windings 78 and 79 of reactor 75 because rectifier 62 blocks such a flow. With no current flow in control windings 78 and 79, the reactance of windings 81 and 82 remains high and very little voltage exists across resistor 83. The rectified voltage impressed on resistor 87 in the circuit of field winding 15 is therefore very small and has a negligible effect upon winding 15.

However, if a large load is suddenly removed from machine 5, the voltage of machine 5 increases and the regulator supplies to field winding 15 a control voltage which tends to reduce the excitation of machine 5. If this action of the regulator tends to decrease the excitation of machine 5 below the value required for stability, the voltage proportional to the in-phase current component will exceed the voltage proportional to the excitation of machine 5 and the voltage of rectifier 62 will exceed the voltages impressed on resistors 71, 73 from rectifiers 63 and 74, thereby sending a current through control windings 78 and 79 of a magnitude depending upon the amount of the voltage excess. This flow of current operates to lower the reactance of windings 81 and 82 of reactor 75 and thereby increases the voltages of resistors 83 and 87. Owing to the connections of rectifier 86, the voltage impressed on resistor 87 from rectifier 86 is of a polarity to oppose a control voltage from the regulator which tends to decrease the excitation of machine 5. Since the maximum amplitude of a control voltage of a polarity to decrease the excitation of machine 5 is limited by rectifier 44, as shown by curve 43 of Fig. 2, the voltage of resistor 87 rapidly overcomes this control voltage of predetermined polarity and increases the excitation of machine 5 to a value at least equal to that required for stable operation.

Another condition under which the operation of machine 5 may become unstable is when machine 5 is operating in parallel with other machines which are predominating in regulating the voltage of circuit 6, 7, 8. If the regulator of machine 5 is set for a lower value than the regulators of the other machines, it will impress on field winding 15 a control voltage tending to reduce the excitation of machine 5 and such reduction in excitation could lead to instability in machine 5.

An additional condition under which the stability of machine 5 may be threatened is when machine 5 is supplying a line on which large amounts of unswitched capacitance are used to maintain the power factor of the line at a reasonable value in connection with a highly inductive load. When this inductive load is removed from the line the unswitched capacitance causes the generator to supply current at a unity or even leading power factor and thereby causes the machine voltage regulator to reduce the excitation of the machine to a possibly dangerous value. However, in both of the above instances the minimum excitation control device of this invention operates in a manner similar to that described above in connection with the sudden removal of load from machine 5 to supply to field winding 15 a voltage to maintain the excitation of machine 5 at least equal to the minimum value required for stability.

If reactors 65 and 75 were energized from different power sources, in case of failure of the power for reactor 65, the minimum excitation control device would indicate that the in-phase current component exceeded the measure of excitation of machine 5 and would therefore supply a voltage to field winding 15 to increase the excitation of machine 5, with possible resultant damage to the system. By energizing both reactors from the same source as described previously, the possibility of such an occurrence is eliminated.

Although but one embodiment of the present invention has been shown and described, it will be apparent to those skilled in the art that various changes and modifications may be made therein without departing from the spirit of the invention or from the scope of the appended claims.

It is claimed and desired to secure by Letters Patent:

1. In a regulating system for a dynamoelectric machine connected to a load circuit, the combination of field winding means for said machine, means for supplying excitation current to said field winding means, control means for controlling the excitation of said field winding means, means including transformer means connected to said load circuit for producing a first voltage which is independent of the voltage of said load circuit and is proportional to the in-phase component of the current supplied by said machine to said load circuit, rectifier means energized by said first voltage, first variable impedance means connected to said field winding means for producing an alternating voltage proportional to the excitation of said field winding means, a rectifier energized by said alternating voltage for producing a second voltage, and second variable impedance means differentially responsive to the voltages of said rectifier and said rectifier means only when the voltage of said rectifier means exceeds the voltage of said rectifier for impressing on said control means a voltage of such polarity as to increase the excitation of said field winding means to maintain said excitation above a predetermined minimum value.

2. In a regulating system for a dynamoelectric machine connected to a load circuit, the combination of means for supplying excitation current to said machine, means responsive to variations in the output voltage of said machine from a predetermined value for producing a control voltage having a polarity and magnitude dependent upon the direction and magnitude of said variations, control means responsive to said control voltage for controlling the excitation of said machine, rectifier means connected to said control means for limiting the amplitude of said control voltage of a predetermined polarity to decrease the excitation of said machine, means for producing a first voltage which is a measure of a characteristic of the current supplied by said machine to said load circuit, means for producing a second voltage which is a measure of the excitation of said machine, and means differentially responsive to said first and said second voltages only when said first voltage exceeds said second voltage for impressing on said control means a voltage opposing said control voltage of said predetermined polarity to maintain the excitation of said machine above a predetermined minimum value.

3. In a regulating system for a dynamoelectric machine connected to the conductors of a three phase load circuit, the combination of field winding means for said machine, means for supplying excitation current to said field winding means, a three phase transformer having primary phase windings and secondary phase windings, said primary windings being energized by a measure of the output voltage of said machine, an autotransformer having terminals and a center tap, means connecting said autotransformer across two of said secondary windings to impress on said autotransformer a voltage in phase with the phase voltage of one of said conductors, impedance means, means for impressing on said impedance means a voltage which is a measure of the current in said one of said conductors, said impedance means being connected to said center tap, means connected to said impedance means and to said terminals for producing a first voltage proportional to the in-phase component of the current supplied by said machine to said one of said conductors, means connected to said field winding means for producing a second voltage proportional to the excitation of said machine, and control means differentially responsive to said first and second voltages only when said first voltage is greater than said second voltage for increasing the excitation of said machine to maintain said excitation above a predetermined minimum value depending on the value of said in-phase component.

4. In a regulating system for a dynamoelectric machine connected to the conductors of a three phase load circuit, the combination of field winding means for said machine, means for supplying excitation current to said field winding means, a three phase transformer having primary phase windings and secondary phase windings, said primary windings being energized by a measure of the output voltage of said machine, an autotransformer having terminals and a center tap, means connecting said autotransformer across two of said secondary windings to impress on said autotransformer a voltage in phase with the phase voltage of one of said conductors, impedance means, means for impressing on said impedance means a voltage which is a measure of the current in said one of said conductors, said impedance means being connected to said center tap, means connected to said impedance means and to said terminals for producing a first voltage proportional to a characteristic of the current supplied by said machine to said one of said conductors, means connected to said field winding means for producing a second voltage proportional to the excitation of said machine, and control means differentially responsive to said first and second voltages only when said first voltage is greater than said second voltage for increasing the excitation of said machine to maintain said excitation above a predetermined minimum value.

5. In a regulating system for a dynamoelectric machine connected to the conductors of a three phase load circuit, the combination of field winding means for said machine, means for supplying excitation current to said field winding means, a three phase transformer having primary phase windings and secondary phase windings, said primary phase windings being connected to be energized by a measure of output voltage of said machine, an autotransformer having terminals and a center tap, means connecting said autotransformer across two of said secondary windings to impress on said autotransformer a voltage which is in phase with the phase voltage of one of said conductors, impedance means, means for impressing on said impedance means a voltage which is a measure of the current in said one of said conductors, said impedance means being connected to said center tap, first means connected to said impedance means and to one of said terminals to produce across said first means a voltage proportional to the sum of the voltages of said autotransformer and said impedance means, second means connected to said impedance means and another of said terminals to produce across said second means a voltage proportional to the difference between the voltages of said impedance means and of said autotransformer, means connected to said first and said second means for producing a first voltage which is a measure of the in-phase component of the current supplied by said machine to said load circuit, means connected to said field winding means for producing a second voltage which is a measure of the excitation of said machine, and control means differentially responsive to said first and said second voltage only when said first voltage exceeds said second voltage for increasing the excitation of said machine to maintain said excitation above a predetermined minimum value depending on the value of said in-phase component.

6. In a regulating system for a dynamoelectric machine connected to a load circuit, the combination of field winding means for said machine, means for supplying excitation current to said field winding means, means responsive to variation in the output voltage of said machine from a predetermined value for producing a control voltage having a polarity and magnitude dependent upon the direction and magnitude of said variations, control means responsive to said control voltage for controlling the supply of excitation current to said field winding means, measuring means connected to said load circuit for producing a first voltage which is a measure of a characteristic of the current supplied by said machine to said load circuit, first and second saturable reactors each having a saturating winding and a reactance winding, a common source of current for the reactance windings of said first and second reactors, means connecting the saturating winding of said first reactor to said field winding means for producing a second voltage which is a measure of the excitation of said machine, means connected between said measuring means and the reactance winding of said first reactor for energizing the saturating winding of said second reactor with the difference between said first and said second voltages only when said first voltage exceeds said second voltage, and means responsive to the voltage of the reactance windings of said second reactor for supplying to said control means a voltage to maintain the excitation of said machine above a predetermined minimum value whereby upon failure of said common source said control means are responsive only to said control voltage.

7. In a regulating system for a dynamoelectric machine connected to a load circuit, the combination of field winding means for said machine, means for supplying excitation current to said field winding means, means connected to said load circuit for producing a first voltage dependent upon the current and the voltage of said load circuit, means connected to said load circuit for producing a second voltage dependent upon the current and the voltage of said load circuit, means for combining said first and second voltages to compensate for said load circuit voltage to produce a third voltage which is substantially independent of said load circuit voltage and which is a measure of the in-phase component of the current supplied by said machine to said load circuit, means connected to said field winding means for producing a fourth voltage which is a measure of the excitation of said machine, and control means differentially responsive to said third and fourth voltages only when said third voltage exceeds said fourth voltage for increasing the excitation of said machine to maintain said excitation above a predetermined minimum value.

8. In a regulating system for a dynamoelectric machine connected to a load circuit, the combination of field winding means for said machine, means for supplying excitation current to said field winding means, means energized by a measure of the output voltage of said machine for producing a control voltage having a polarity and a magnitude dependent upon the sign and magnitude of variations in said output voltage from a predetermined value, control means responsive to said control voltage for controlling the supply of excitation current to said field winding means, means connected to said load circuit for producing a first voltage dependent upon the current and the voltage of said load circuit, means connected to said load circuit for producing a second voltage dependent upon the current and the voltage of said load circuit, means for combining said first and second voltages to compensate for said load circuit voltage to produce a third voltage which is substantially independent of said load circuit voltage and which is a measure of the in-phase component of the current supplied by said machine to said load circuit, means connected to said field winding means for producing a fourth voltage proportional to the excitation of said field winding means, means differentially responsive to said third and fourth voltages only when said third voltage exceeds said fourth voltage for impressing on said control means a voltage of such polarity as to increase the excitation of said field winding means to maintain said excitation above a predetermined minimum value depending upon the value of said in-phase component, and a stabilizing transformer having a primary winding and a secondary winding, said primary winding being connected to said field winding means and said secondary winding being connected to said control means.

9. In a regulating system for a dynamoelectric machine connected to the conductors of a load circuit, the combination of field winding means for said machine, means for supplying excitation current to said field winding means, means energized by a measure of the output voltage of said machine for producing a control voltage having a polarity and a magnitude dependent upon the sign and magnitude of variations in said output voltage from a predetermined value, control means responsive to said control voltage for controlling the supply of excitation current to said field winding means, means connected to said load circuit for producing a first voltage proportional to the vector sum of a voltage proportional to the current in one of said conductors of said load circuit and the voltage of said conductor to neutral, means connected to said load circuit for producing a second voltage proportional to the vector difference between a voltage proportional to said current in said one conductor and said voltage of said conductor to neutral, means including rectifier means for producing a third voltage proportional to the difference between the absolute values of said first and said second voltages, whereby said third voltage is substantially independent of the magnitude of said load circuit voltage and is a measure of the in-phase component of said load circuit current, means connected to said field winding means for producing a fourth voltage proportional to the excitation of said field winding means, and means differentially responsive to said third and fourth voltages only when said third voltage exceeds said fourth voltage for impressing on said control means a voltage of such polarity as to increase the excitation of said field winding means to maintain said excitation above a predetermined minimum value depending upon the value of said in-phase component.

10. In a regulating system for a dynamoelectric machine connected to the conductors of a load circuit, the combination of field winding means for said machine, means for supplying excitation current to said field winding means, means energized by a measure of the output voltage of said machine for producing a control voltage having a polarity and a magnitude dependent upon the sign and magnitude of variations in said output voltage from a predetermined value, control means responsive to said control voltage for controlling the supply of excitation current to said field winding means, means including rectifier means connected to said control means for limiting the amplitude of said control voltage when said control voltage has the predetermined polarity which decreases the excitation of said field winding means, means connected to said load circuit for producing a first voltage proportional to the vector sum of a voltage proportional to the current in one of said conductors of said load circuit and the voltage of said conductor to neutral, means connected to said load circuit for producing a second voltage proportional to the vector difference between a voltage proportional to said current in said one conductor and said voltage of said conductor to neutral, means for producing a third voltage proportional to the difference between the absolute values of said first and second voltages, whereby said third voltage is substantially independent of the magnitude of said load circuit voltage and is a measure of the in-phase component of the current in said load circuit, means connected to said field winding means for producing a fourth voltage proportional to the excitation of said field winding means, means differentially responsive to said third and fourth voltages only when said third voltage exceeds said fourth voltage for impressing on said control means a voltage opposing said control voltage of said predetermined polarity to maintain the excitation of said machine above a predetermined minimum value, and a stabilizing transformer having a primary winding and a secondary winding, said primary winding being connected to said field winding means and said secondary winding being connected to said control means.

DANIEL J. SIKORRA.

REFERENCES CITED

The following references are of record in the file of this patent:

UNITED STATES PATENTS

| Number | Name | Date |
|---|---|---|
| 2,459,640 | Griscom et al. | Jan. 18, 1949 |
| 2,478,623 | Crary et al. | Aug. 9, 1949 |